United States Patent [19]

Homan et al.

[11] 4,252,932

[45] Feb. 24, 1981

[54] OXYGEN-CURABLE MERCAPTOORGANOSILOXANE COMPOSITIONS CATALYZED BY METAL CARBONYL COMPOUNDS AND METHOD OF FORMING HIGHER MOLECULAR WEIGHT PRODUCTS THEREFROM

[75] Inventors: Gary R. Homan; Chi-Long Lee, both of Midland, Mich.

[73] Assignee: Dow Corning Corporation, Midland, Mich.

[21] Appl. No.: 99,252

[22] Filed: Dec. 3, 1979

[51] Int. Cl.$^3$ .............................................. C08G 77/06
[52] U.S. Cl. ................................ 528/15; 260/37 SB; 528/30; 528/33
[58] Field of Search ............................. 528/15, 30, 33; 260/37 SB

[56] References Cited

U.S. PATENT DOCUMENTS

| | | | |
|---|---|---|---|
| 3,445,419 | 5/1969 | Vanderlinde | 260/37 |
| 4,066,603 | 1/1978 | Homan et al. | 260/37 SB |
| 4,070,328 | 1/1978 | Homan et al. | 260/37 SB |
| 4,070,329 | 1/1978 | Homan et al. | 260/37 SB |
| 4,133,939 | 1/1979 | Bokerman et al. | 428/447 |
| 4,151,156 | 4/1979 | Itoh et al. | 260/37 SB |

OTHER PUBLICATIONS

Nametkin et al., "Synthesis and Some Properties of Sulfur-Containing Iron Tricarbonyl Complexes", Journal of Organometallic Chemistry, Elsevier Sequoia, S.A., Lausanne, The Netherlands, 149, pp. 355–370 (1978).

*Primary Examiner*—Melvyn I. Marquis
*Attorney, Agent, or Firm*—Richard E. Rakoczy

[57] ABSTRACT

Compositions stable in the absence of oxygen are formed by mixing the following substantially in the absence of oxygen (A) mercapto-functional organosiloxanes containing an average of at least two mercapto-functional substituents per molecule;

(B) optionally, at least one filler;

(C) a catalytic amount of a metal carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$, dicyclopentadienyldinickel dicarbonyl, $Mn_2(CO)_{10}$, methylcyclopentadienylmanganese tricarbonyl and cyclopentadienylcobalt dicarbonyl, preferably from 0.1 to 6 parts by weight of iron carbonyl catalyst per 100 parts by weight of part (A).

The compositions polymerize or cure upon exposure to oxygen. By utilizing various types and amounts of mercapto-functional organosiloxanes, higher molecular weight products useful as encapsulating gels, coating resins and elastomeric sealants can be obtained by exposing the compositions of the present invention to oxygen.

30 Claims, No Drawings

OXYGEN-CURABLE MERCAPTOORGANOSILOXANE COMPOSITIONS CATALYZED BY METAL CARBONYL COMPOUNDS AND METHOD OF FORMING HIGHER MOLECULAR WEIGHT PRODUCTS THEREFROM

BACKGROUND OF THE INVENTION

1. Field of the Invention

This invention relates to compositions including organosiloxane polymers containing sulfur and to a method of forming higher molecular weight products from such compositions. This invention also relates to organosiloxane gels, elastomers and resins containing sulfur.

2. Description of the Prior Art

Compositions containing mercaptoorganosiloxanes free of any vinyl functionality which are polymerized by means of the mercapto groups to resins and sealants are known in the art. For example, in U.S. Pat. No. 4,133,939, Bokerman and Gordon teach a method of coating a substrate with a silicone release coating involving the radiation cure of mercapto-functional polydiorganosiloxane fluids mixed with a sensitizer such as benzophenone. While a radiation curing mechanism is rapid and provides one-package systems which are stable in the absence of heat and light, it is useful only for relatively thin coatings and requires a high intensity radiation source such as ultraviolet light or electron beams.

Peroxide cure of mercaptoorganosiloxanes free of vinyl unsaturation is also known, as is demonostrated by Homan and Lee in U.S. Pat. No. 4,070,329. In that patent, the patentees teach mixtures of mercaptoorganopolysiloxanes, organic peroxides and, optionally, a filler to provide a composition which cures at room temperature or by heating to form elastomers which are useful as sealants and rubber articles. Likewise, Homan and Lee in U.S. Pat. No. 4,070,328 claim the use of mixtures of mercaptoorganopolysiloxanes, organic hydroperoxides, a nitrogen compound and, optionally, a filler to produce a composition which cures at room temperature to elastomers which are useful as sealants and rubber articles. However, the above compositions are not one-package systems, since the polymerization or cure begins immediately upon mixing the ingredients.

Vanderline, in U.S. Pat. No. 3,445,419, teaches the production of a type of mercapto-functional copolymer consisting of organosiloxanes with mercapto-functional organic compound segments which are prepared by grafting a mercapto-functional carboxylic acid ester such as pentaerythritol tetrakis(3-mercaptopropionate) onto a vinyl-terminated organosiloxane. When an alkaline catalyst such as an amine is added to the resulting graft-copolymer, there is obtained a composition which is stable in the absence of air, but cures to an elastomer at room temperature upon exposure to air. However, this patent does not suggest the use of metal carbonyl compounds as catalysts for the room temperature polymerization or cure of the compositions hereinafter described.

Nametkin, et al., in the *Journal of Organometallic Chemistry*, 149 pp. 355–370 (1978) report that when stoichiometric amounts of $Fe(CO)_5$, $Fe_2(CO)_9$, or $Fe_3(CO)_{12}$ are reacted with thiols of the general formula RSH, where R is an alkyl or aryl radical, in solution, a complex $\{RSFe(CO)_3\}_2$ and a small amount of the disulfide, RSSR, is produced at room temperature and that $Fe_3(CO)_{12}$ is the most effective catalyst. Thermal decomposition of the complex in n-dodecane solution at 160° C. in the presence of air results in decomposition of the complex to form the disulfide. However, this article does not teach that $Fe(CO)_5$, $Fe_2(CO)_9$ or $Fe_3(CO)_{12}$ will function as a catalyst in non-stoichiometric amounts for the room temperature polymerization or cure of the compositions hereinafter described.

DESCRIPTION OF THE INVENTION

The novel distinguishing features of the present invention are that the use of a metal carbonyl catalyst produces compositions which are one-package, storage-stable in the absence of oxygen, and easily cured simply by exposing the composition to an oxygen atmosphere, such as air, or pure oxygen gas. The compositions of the present invention have an advantage over acetoxy-functional, moisture-cured, one-component compositions, such as those found in U.S. Pat. Nos. 3,035,016 and 3,077,465, in that no corrosive by-products are evolved during cure. Compositions which utilize platinum-catalyzed addition of SiH to vinyl are preferably cured by heating when formulated into one-package systems. These one-package platinum catalyzed systems cure very slowly at room temperature. Fast, room temperature cures using this system require two-part formulations while compositions of the present invention are one-package systems which cure much faster than one-package platinum catalyzed systems.

This invention relates to a composition of matter, stable in the absence of oxygen, consisting essentially of a product obtained by mixing the following substantially in the absence of oxygen (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

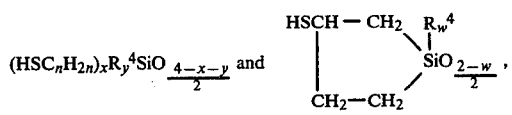

any other siloxane units present having the average unit formula

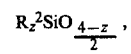

wherein each $R^2$ is a hydroxyl radical or an organic radical selected from the group consisting of $R^4$ and 3,3,3-trifluoropropyl radicals, each $R^4$ is $R^3$ or $OR^1$, each $R^3$ is an alkyl radical of 1 to 4 inclusive carbon atoms or phenyl radical, each $R^1$ is an alkyl radical of 1 to 4 inclusive carbon atoms, n has a value of from 2 to 4 inclusive, w has a value of from 0 to 1 inclusive, x has a value of from 1 to 2 inclusive, y has a value of from 0 to 2 inclusive, z has a value of from 0 to 3 inclusive and the sum of x+y has a value of from 1 to 3 inclusive, and the ratio of total $R^3$, $HSC_nH_{2n}$—,

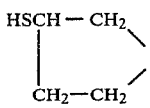

and 3,3,3-trifluoropropyl radicals to silicon atoms in the mercapto-functional organosiloxane is in the range of 0.98/1 to 3.00/1;

(B) 0 to 200 parts by weight of at least one filler; and (C) a catalytic amount of a metal carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$ dicyclopentadienyldinickel dicarbonyl, $Mn_2(CO)_{10}$, methylcyclopentadienylmanganese tricarbonyl and cyclopentadienylcobalt dicarbonyl.

This invention also relates to a method of forming a higher molecular weight product which consists essentially of the steps of (I) mixing at least one mercapto-functional organosiloxane as defined in (A) above and a catalytic amount of a metal carbonyl catalyst defined in (C) above to form a mixture and (II) exposing said mixture to oxygen. This invention further relates to the product obtained by exposing the above composition or mixture to oxygen.

"Oxygen" is intended to mean gaseous oxygen which can be in the form of pure oxygen gas or atmospheric oxygen. Mercapto-functional organosiloxanes will also be referred to as mercaptoorganosiloxanes and includes disiloxanes, trisiloxanes and polysiloxanes consisting of siloxane units, some of which are mercapto-functional. Techniques for mixing compositions which are oxygen or moisture sensitive are well-known in the art. Bread dough mixers can be used for viscous mercaptoorganosiloxanes and low-shear mixers can be used for lower viscosity compositions.

This invention has two aspects. One is a novel method of polymerizing or curing mercapto-functional organosiloxanes to form higher molecular weight products. The other is directed toward the formation of storage-stable compositions. In order to accomplish the first aspect, one merely exposes a mixture of the mercapto-functional organosiloxane and a metal carbonyl catalyst to oxygen. Thus, if storage stability is not required, the mercapto-functional organosiloxane and metal carbonyl catalyst can be mixed together in the presence of oxygen and immediately allowed to polymerize or cure.

When storage-stable compositions are desired, the ingredients are mixed in the substantial absence of oxygen by any well-known means. The preferred procedure is to mix the mercaptoorganosiloxanes and filler, if any, under a dry nitrogen atmosphere. The mixture can then be subjected to a vacuum, such as 30 millimeters of mercury, for a short time to remove any trapped oxygen and water. The catalyst can then be added, preferably as a solution in a suitable solvent or diluent such as toluene, mineral oil or trimethylsiloxy endblocked polydimethylsiloxane fluid. Many of these catalysts are sensitive to oxygen and water, especially the cobalt and nickel compounds (some of these compounds also absorb carbon dioxide). It is therefore preferable that the mixed compositions be substantially free of both water and oxygen to maximize storage life. Small amounts of water appear to reduce the cure rate slightly while the presence of oxygen will cause premature gelation. Therefore, the containers used to store the catalyzed compositions should be carefully selected to avoid materials which are sufficiently oxygen permeable to appreciably affect storage stability.

The subject matter of the present application is limited to organosiloxane compounds and polymers which contain mercapto-functionality. Mercapto-functional polymers which do not contain silicon are classified as organic polymers for purposes of these applications and are the subject of U.S. Patent Application Ser. No. 099,282, filed on Dec. 3, 1979, to Gary R. Homan and Chi-Long Lee entitled "Oxygen-Curable Mercapto-Functional Organic Compound Compositions Catalyzed By Metal Carbonyl Compounds And Method Of Forming Higher Molecular Weight Products Therefrom". Likewise mercapto-functional polymer compositions containing both organosiloxanes and organic compounds and polymers are the subject of U.S. Patent Application Ser. No. 099,254 filed on Dec. 3, 1979, to Gary R. Homan and Chi-Long Lee entitled "Oxygen-Curable Mercapto-Functional Organosilicon-Organic Compound Compositions Catalyzed By Metal Carbonyl Compounds And Method Of Forming Higher Molecular Weight Products Therefrom." The two above applications are assigned to the same assignee as the present invention.

The substituents attached to silicon atoms can be $R^2$ which can be hydroxyl, $R^4$ or 3,3,3-trifluoropropyl radicals. $R^4$ can be $R^3$ which can be alkyl radicals of 1 to 4 inclusive carbon atoms, such as methyl, ethyl, propyl, isopropyl and butyl, phenyl radicals, or alkoxy radicals of the formula $OR^1$, where $R^1$ is an alkyl radical of 1 to 4 inclusive carbon atoms, such as methoxy, ethoxy, isopropoxy and butoxy. The mercapto-functional substituents present in the form of $HSC_nH_{2n}$, where n is 2 to 4, can be, for example, beta-mercaptoethyl, gamma-mercaptopropyl, 3-mercaptobutyl, and 3-mercapto,2-methylpropyl. Another mercapto-functional substituent can be 2-mercaptotetramethylene where both ends of the radical are attached to the same silicon atom.

The siloxane units containing no mercapto groups which have the average unit formula

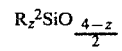

can be $SiO_2$ units, monosubstituted units such as monomethylsiloxane units, monoethylsiloxane units, monopropylsiloxane units, monobutylsiloxane units, or monophenylsiloxane units; disubstituted units such as dimethylsiloxane units, diethylsiloxane units, diphenylsiloxane units, phenylmethylsiloxane units, methylbutylsiloxane units, phenylethylsiloxane units, 3,3,3-trifluoropropylmethylsiloxane units, and methylisopropylsiloxane units; and trisubstituted units such as trimethylsiloxane units, phenyldimethylsiloxane units, triethylsiloxane units, diphenylmethylsiloxane units, diphenylisopropylsiloxane units, 3,3,3-trifluoropropyldimethylsiloxane units, diphenylbutylsiloxane units and triphenylsiloxane units.

The mercapto-functional siloxane units which have the average unit formula

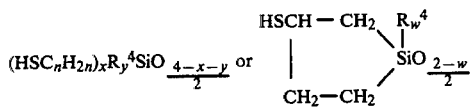

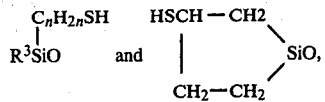

include the following $HSC_nH_{2n}SiO_{0.5}$,

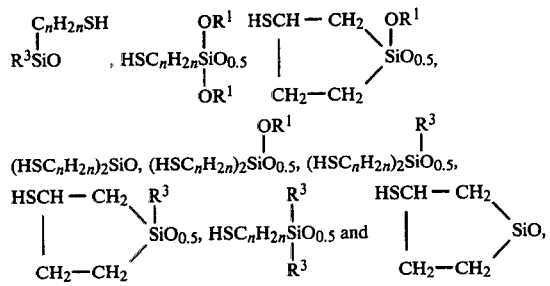

wherein $R^1$, $R^3$ and n are as defined above and n preferably has a value of 3. Mercaptoorganosiloxanes useful in the present invention contain an average of at least two mercapto-functional siloxane units per molecule.

The cured products of this invention can range in properties from soft gels to elastomers to hard resins. Physical properties such as durometer value and hardness are related to cross-link density. Cross-link density can be varied by several mechanisms. One mechanism is by adjusting the ratio of organic substituents (total alkyl, mercapto-functional, 3,3,3-trifluoropropyl, and phenyl substituents) bonded through Si-C bonds to silicon. Generally, the lower the ratio, the harder the cured product will be when all other variables, such as types of substituents and structure, are kept equal. In elastomeric products, higher durometer values generally indicate an increase in cross-link density. Another means for varying the cross-link density is to change the number of mercapto-functional siloxane units per molecule in the mercaptoorganosiloxane.

Compositions consisting only of mercaptoorganosiloxanes which contain an average of only two mercapto groups per molecule are generally only capable of chain-extension when exposed to oxygen and thus produce higher molecular weight gums which could find utility as encapsulants. Compositions containing an average of more than two mercapto groups per molecule are capable of polymerizing in the presence of oxygen to form three-dimensional networks which can range from soft gels where the average number of mercapto groups is close to two to hard resins where the mole percent of mercapto-functional siloxane units based on the total number of siloxane units in the mercapto-organosiloxane approaches 100 percent.

The compositions of the present invention are especially useful in forming elastomeric products with tack-free surfaces which are produced by simply exposing the composition to air. Compositions curable to elastomers with a wide variety of physical properties can easily be formulated by selecting the proper mercapto-functional polydiorganosiloxanes.

Pendant-functional mercaptopolydiorganosiloxanes useful in compositions of the present invention are mercaptopolydiorganosiloxanes containing $R_3{}^3SiO_{0.5}$ or $R_2{}^3(HO)SiO_{0.5}$ endblocking siloxane units and mercapto-functional siloxane units selected from the group consisting of any remaining siloxane units being $R_2{}^3SiO$, wherein $R^3$ and n are defined above, the average number of mercapto-functional siloxane units per molecule is greater than 2 and the number average molecular weight of the pendant-functional mercaptopolydiorganosiloxane is less than 400,000. Compositions consisting solely of pendant-functional mercaptopolydiorganosiloxanes can result in products which range in properties from soft gels to elastomers to hard resins when exposed to oxygen.

When pendant-functional mercaptopolydiorganosiloxanes are used as the sole type of mercaptoorganosiloxane in formulations curable to elastomers, it is preferred that $R^3$ is methyl, n is 3, and the pendant-functional mercaptopolydiorganosiloxane has a number average molecular weight of less than 100,000 and contains a sufficient number of mercapto-functional siloxane units to result in a percentage of mercapto groups in the range of 0.14 to 2.5 percent based on the total weight of pendant-functional mercaptopolydiorganosiloxane.

Terminal-functional mercaptopolydiorganosiloxanes useful in elastomeric sealant, gel and gum formulations as chain-extending polymers are mercaptopolydiorganosiloxanes containing mercapto-functional siloxane units selected from the group consisting of $HSC_nH_{2n}(R^3)_2SiO_{0.5}$, $HSC_nH_{2n}(R^1O)_2SiO_{0.5}$,

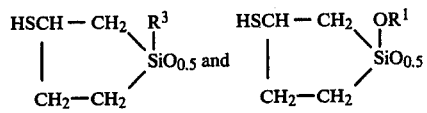

any remaining siloxane units being $R_2{}^3SiO$, wherein $R^3$, $R^1$ and n are defined above and the number average molecular weight of the terminal-functional mercaptopolydiorganosiloxane is less than 400,000. Preferably, each $R^3$ is methyl, the mercapto-functional siloxane units are selected from the group consisting of $HSCH_2CH_2CH_2(CH_3)_2SiO_{0.5}$ and

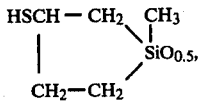

the number average molecular weight of the mercaptopolydiorganosiloxane is less than 100,000 and the weight percentage of mercapto groups present is in the range of 0.07 to 0.45 percent of the total weight of terminal-functional mercaptopolydiorganosiloxane. Polymerization of terminal-functional structures alone generally produces gums because only linear chain-extension is possible.

Another type of mercaptopolydiorganosiloxane useful in compositions of the present invention is a terminal-functional mercaptopolydiorganosiloxane which also contains pendant mercapto-functional siloxane units (hereinafter referred to as hybrid-functional mercaptopolydiorganosiloxanes). Such mercaptopolydiorganosiloxanes contain two terminal mercapto-functional siloxane units selected from the group consisting of $(HSC_nH_{2n})R_2^3SiO_{0.5}$, $(HSC_nH_{2n})(R^1O)_2SiO_{0.5}$,

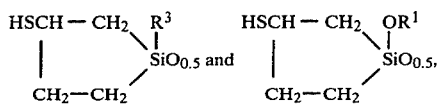

and at least one mercapto-functional siloxane unit selected from the group consisting of siloxane units of the formula $(HSC_nH_{2n})R^3SiO$ and

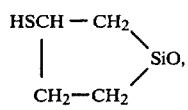

any remaining siloxane units being $R_2^3SiO$, wherein $R^3$, $R^1$ and n are defined above and the number average molecular weight of the hybrid-functional mercaptopolydiorganosiloxane is less than 400,000. Compositions consisting solely of hybrid-functional mercaptopolydiorganosiloxanes can result in products which range in properties from soft gels to elastomers to hard resins when exposed to oxygen.

Hybrid-functional mercaptopolydiorganosiloxanes are quite versatile and can be used as the sole type of mercaptopolydiorganosiloxane in formulations which cure to elastomers. In such formulations, it is preferred that each $R^3$ is methyl, the terminal mercapto-functional siloxane units are selected from the group consisting of $(HSCH_2CH_2CH_2)(CH_3)_2SiO_{0.5}$ and

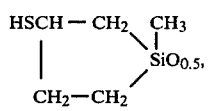

and the hybrid-functional mercaptopolydiorganosiloxane has a number average molecular weight of less than 100,000 and contains a sufficient number of mercapto-functional siloxane units to result in a weight percentage of mercapto groups in the range of 0.14 to 3 percent based on the total weight of hybrid-functional mercaptopolydiorganosiloxane. Hybrid-functional mercaptopolydiorganosiloxanes can be produced which cure to elastomeric products which range in properties from soft products with high elongation values to hard products which are not easily elongated by adjusting the molecular weight and/or the weight percent of mercapto groups in the mercaptopolydiorganosiloxane.

Blends of pendant- and terminal-functional mercaptopolydiorganosiloxanes can be used to obtain cured products which range in properties from soft gels to hard resins or from gums to hard rubbers. Likewise, the properties of hybrid-functional mercaptopolydiorganosiloxanes can also be altered by blending them with terminal-functional mercaptopolydiorganosiloxanes. To obtain blends which cure to elastomers, it is preferred that mercaptopolydiorganosiloxanes which are within the aforementioned preferred ranges for the mercaptopolydiorganosiloxanes be used. Thus, a blend of pendant- and terminal-functional mercaptopolydiorganosiloxanes would contain at least 0.14, but less than 2.5, weight percent of mercapto groups based upon the total weight of the mercaptopolydiorganosiloxanes in the blend while a blend of hybrid- and terminal-functional mercaptopolydiorganosiloxanes would contain at least 0.14, but less than 3, weight percent mercapto groups based upon the total weight of the mercaptopolydiorganosiloxanes in the blend.

The methods for preparing the above mercaptopolydiorganosiloxanes are well-known in the art. One method for making a type of pendant-functional mercaptopolydiorganosiloxane containing $HSC_nH_{2n}(R^3)SiO$ and $R_3^3SiO_{0.5}$ siloxane units is taught by Viventi in U.S. Pat. No. 3,346,405. Another method is taught in the Bokerman, et al, patent described previously. For example, Example 1 of the Bokerman, et al, patent teaches the production of a pendant-functional mercaptopolydiorganosiloxane which is a trimethylsiloxy-endblocked copolymer consisting of about 94 mole percent dimethylsiloxane units and about 5 mole percent 3-mercaptopropylmethylsiloxane units. Pendant-functional mercaptopolydiorganosiloxanes containing $HSC_nH_{2n}(R^3)SiO$ and $(HO)R_2^3SiO_{0.5}$ siloxane units can be produced by modifying the Viventi or Bokerman, et al, methods above. For example, such hydroxyl-endblocked mercaptopolydiorganosiloxanes can be produced by omitting the addition of triorganochlorosilane from the reaction mixture in the method taught by Viventi. Le Grow, in U.S. Pat. No. 3,655,713 teaches a procedure for making both pendant-functional and terminal-functional mercaptopolydiorganosiloxanes containing siloxane units possessing 2-mercaptotetramethylene substituents.

Several methods for producing terminal-functional mercaptodiorganosiloxanes containing $HSC_nH_{2n}R_2^3SiO_{0.5}$ siloxane units are known. One method involves the use of a disiloxane bearing a silicon-bonded mercaptoalkyl radical, such as sym-tetramethyl bis(3-mercaptopropyl)-disiloxane, and a cyclic polydiorganosiloxane such as octamethylcyclotetrasiloxane. Appropriate amounts of the mercapto-functional disiloxane and cyclic polydiorganosiloxane are heated together with an acidic catalyst such as trifluoromethanesulfonic acid for 3 to 8 hours. The mixture is then neutralized and the mercapto-terminated polydiorganosiloxane is recovered. Hybrid-functional polymers can be prepared using the same type of compounds and techniques outlined above for producing terminal-functional mercaptopolydiorganosiloxanes by adding a cyclic mercaptopolydiorganosiloxane such as $\{HSCH_2CH_2CH_2(CH_3)SiO\}_4$ to the reaction mixture to introduce pendant-functional groups into the mercaptopolydiorganosiloxane. Likewise, the compounds and techniques used in preparing pendant-functional mercaptopolydiorganosiloxanes can be used to produce hybrid-functional types by substituting mercapto-functional endblocking units, which can be introduced in the form of a disiloxane such as sym-tetramethyl bis(3-mercaptopropyl)disiloxane, in place of non-functional endblocking units, such as those introduced in the form of hexamethyldisiloxane, in the reaction mixture.

Cyclic mercaptopolydiorganosiloxanes can be prepared by various methods, one of which involves preparing the corresponding chloroalkylsilane, such as 3-chloropropylmethyldichlorosilane, and hydrolyzing the silanes to form a mixture of linear and cyclic polydiorganosiloxanes. If desired, the ratio of cyclic to linear polydiorganosiloxanes can be altered by heating in the presence of an acidic catalyst for a period of time, during which time a portion of the cyclic polydiorganosiloxanes formed is being removed by distillation to shift the equilibrium of the reaction in the direction which favors the formation of cyclic polydiorganosiloxanes. Then, for example, Viventi teaches that the chloroalkyldiorganosiloxanes can be reacted with sodium sulfohydride to produce mercaptopolydiorganosiloxanes. Mercapto-functional silanes containing alkoxy groups such as 3-mercaptopropylmethyldimethoxysilane can also be hydrolyzed at about 40°–50° C. in the presence of an acidic catalyst and vacuum-stripped at 120° C. to remove alcohol and other undesirable volatiles present. Such mixtures can also be referred to as, for example, the 3-mercaptopropylmethyl hydrolyzate of 3-mercaptopropylmethyldimethoxysilane. Other means for preparing cyclic mercaptopolydiorganosiloxanes will be apparent to persons skilled in the art.

The production of a type of mercapto-functional organosiloxane resins by the partial hydrolysis of mixtures of silanes such as $HSC_nH_{2n}Si(OR^1)_3$ and $R_2^3Si(OR^1)_2$ is demonstrated by the Viventi patent. Likewise, mercapto-functional organosiloxane resins result when a sufficient number of siloxane units such as $R^3SiO_{1.5}$ are present in the mercaptoorganosiloxanes taught in the Le Grow patent. The Viventi, Le Grow and Bokerman, et al, patents are hereby incorporated by reference to teach the production of mercaptoorganosiloxanes useful in compositions of the present invention.

Mercaptopolydiorganosiloxanes which contain endblocking units of the formula

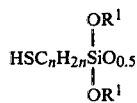

can be prepared by reacting a hydroxyl endblocked polydiorganosiloxane and a (mercaptoalkyl)trialkoxysilane of the formula

in the presence of solid potassium hydroxide or potassium silanolate catalysts. The potassium silanolate catalyst is preferred for higher viscosity polydiorganosiloxanes. The (mercaptoalkyl)trialkoxysilane is preferably used in an excess of about 10 mole percent over stoichiometric amounts. The resulting product is essentially a polydiorganosiloxane endblocked with units of the formula

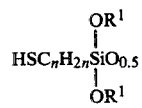

There may be some small amount of units wherein two SiOH groups have reacted with one (mercaptoalkyl)-trialkoxysilane molecule, but these amounts are small enough that the character of the endblocked polydiorganosiloxane is not noticeably altered.

Compositions with various properties may be formulated using the above mercaptopolydiorganosiloxanes. Generally, use of only the pendant-functional mercaptopolydiorganosiloxanes results in elastomers with higher modulus values than formulations which additionally include terminal-functional mercaptopolydiorganosiloxanes. The latter give sealants with lower modulus values which are thus capable of much greater elongation before the cured composition tears. As a result, the sole use of pendant-functional mercaptopolydiorganosiloxanes results in cured sealants which are less readily elongated and are therefore primarily useful where there is only a small amount of movement in the joint to be sealed. Blends of the pendant and terminal-functional mercaptopolydiorganosiloxanes are useful in building sealant formulations where a relatively large degree of joint movement occurs due to varying temperatures. It should be noted that not all the elastomeric sealant compositions of the present invention possess exceptionally good adhesion to common building substrates such as concrete or metal and can require the use of primers in certain applications.

Fillers may be used with the compositions of this invention, but are not required. Extending fillers can preferably be used in amounts of 10 to 200 parts by weight per 100 parts by weight of mercaptoorganosiloxane, especially in the elastomeric sealant formulations. Suitable extending fillers can be titanium dioxide, calcium carbonate, talc, clay, ground or crushed quartz, diatomaceous earth, fibrous fillers such as glass or asbestos and the like.

Reinforcing fillers such as fume silica, surface-treated fume silica, carbon black and the like may also be used. As is well-known in the art, reinforcing fillers cannot be used in as large an amount as extending fillers can be used, thus any formulation including such fillers would not contain more than 70 parts by weight of reinforcing fillers per 100 parts by weight of the mercaptoorganosiloxanes and preferably, from 5 to 30 parts. Extending fillers can also be included in formulations containing reinforcing fillers in amounts of up to 200 parts by weight per 100 parts by weight of the mercaptoorganosiloxanes less the amount of reinforcing filler present. Other additives such as coloring pigments, fireretarding compounds and the like are also contemplated as being useful in the present invention. Since many of the catalysts are affected by water, it is preferred that any fillers or additives be substantially free of water to provide maximum shelf life. Routine testing can determine the effect of fillers and additives on shelf life.

Metal carbonyl compounds contemplated as being useful as catalysts in the practice of the present invention are $Fe(CO)_5$, $Fe_2(CO)_9$, $Fe_3(CO)_{12}$, dicyclopentadienyldiiron tetracarbonyl or $\{(C_5H_5)Fe(CO_2)\}_2$, butadieneiron tricarbonyl or $(C_4H_6)Fe(CO)_3$, cyclohexadieneiron tricarbonyl or $(C_6H_8)Fe(CO)_3$, $Ni(CO)_4$, dicyclopentadienyldinickel dicarbonyl or $\{C_5H_5Ni(CO)\}_2$, $Mn_2(CO)_{10}$, methylcyclopentadienylmanganese tricarbonyl or $(CH_3C_5H_4)Mn(CO)_3$ and cyclopentadienylcobalt dicarbonyl or $(C_5H_5)Co(CO)_2$. The amount of catalyst necessary is not critical. Any catalytic amount can be employed which will adequately polymerize or cure the compositions in the presence of oxygen to result in a product which is satisfactory for the desired end use. Changing the level of catalyst may alter the polymerization or cure rate and can alter the properties of the cured product, especially in the elastomeric products. We have found that a range of 0.1 to 6 parts by weight of metal carbonyl compound per 100 parts by weight of mercaptoorganosiloxanes is usually sufficient. The preferred metal carbonyl catalysts are those containing iron, especially $Fe(CO)_5$. When iron carbonyl catalysts were employed, it can be preferable to formulate the compositions such that the ratio of total moles of mercapto groups (—SH) present in the mercaptoorganopolysiloxanes to total moles of iron atoms in the catalyst (SH/Fe ratio) is greater than one.

As noted previously, many of the metal carbonyl compounds are affected by oxygen and/or water and some may even absorb carbon dioxide. This is especially true of the cobalt and nickel compounds. Thus, to aid in the handling of the compounds and to further speed the incorporation of the catalyst into the composition, it is preferable to first dissolve the compounds in a hydrophobic solvent or diluent such as toluene, mineral oil or a trimethylsiloxy endblocked polydimethylsiloxane fluid. A 20 weight percent solution of iron pentacarbonyl (Fe(CO)$_5$) in a trimethylsiloxy endblocked polydimethylsiloxane fluid is preferred. Metal carbonyl compounds are well-known in the art and methods for their preparation may be found in the literature, for example, in Organometallic Compounds, Volume I, Dub, editor, Springer-Verlag, N.Y. (1966) and Handbook of Organometallic Compounds, Hagihara, Kumada and Okawara, editors, W. A. Benjamin Co., N.Y., pp. 822–903 (1968), which are both hereby incorporated by reference to teach the production of the above metal carbonyl compounds. Metal carbonyl compounds are known to be toxic and somewhat volatile, therefore care should be exercised when such compounds are handled and adequate ventilation should be provided during the polymerization or cure of these compositions.

It is believed that compositions of the present invention polymerize or cure to form higher molecular weight products by the formation of disulfide (—SS—) bonds upon exposure to oxygen due to the action of the metal carbonyl catalyst.

The compositions polymerize or cure rapidly at room temperature and appear to cure from the surface in contact with oxygen inward. Elastomeric sealant compositions have been shown to develop 85 percent of their final physical properties in 18 hours. Heating will accelerate the rate of cure in the manner that most chemical reactions are accelerated by a rise in temperature and this can be used to advantage where a protective coating of resin is being applied to a substrate. Compositions containing low amounts of mercapto groups, especially elastomeric sealants containing less than 2 weight percent mercapto groups are essentially free of any offensive odor. When compared to moisture-cure sealants which evolve acetic acid during cure such as those found in U.S. Pat. Nos. 3,035,016 and 3,077,465, the compositions of this invention are non-corrosive to the substrate. In practicing the present invention, a formulator may select polymers and fillers which together with the proper level of catalyst will yield cured products such as encapsulating gels, hard resins, coatings and elastomeric sealants.

The following examples are intended as being merely illustrative and are not to be construed as limiting the scope of the present invention, which is properly defined by the appended claims.

EXAMPLE 1

Table I summarizes the catalyst solutions prepared for use in this example. Oxygen-curable compositions were formed by mixing catalyst solution with a pendant-functional mercaptopolydiorganosiloxane in the substantial absence of oxygen such that the same number of moles of each catalyst was added to the same amount of mercaptopolydiorganosiloxane.

The pendant-functional mercaptopolydiorganosiloxane used was a trimethylsiloxy-endblocked copolymer of dimethylsiloxane and 3-mercaptopropylmethylsiloxane units, there being about 5 mole percent of 3-mercaptopropylmethylsiloxane units present based upon the total moles of siloxane units present. The mercaptopolydiorganosiloxane had a viscosity of about 1.2 Pascal·seconds (Pa·s) at 25° C. and is hereinafter referred to as Polymer A.

Eight samples were prepared, each containing twenty grams of Polymer A. To each sample was added 4 grams of 0.1 molar solution of catalyst, 8 grams of 0.05 molar solution or 2 grams of 0.2 molar solution, respectively, wherein the amount added was determined by the catalyst being added. The compositions were exposed to atmospheric oxygen at room temperature and the time for the surface of the extruded sample to become gelled, or "skin-over time", was recorded as shown in Table I. The most effective catalyst in terms of skin-over time was iron pentacarbonyl (Fe(CO)$_5$).

TABLE I

| Catalytic Activity of Various Metal Carbonyls | | | | |
|---|---|---|---|---|
| Ex. | Compound | Skin-over Time | Molarity | Solvent |
| A | Fe(CO)$_5$ | 8 min. | 0.20 | Toluene |
| B | Fe$_2$(CO)$_9$ | 17 min. | 0.05 | Ansul 141[1] |
| C | Fe$_3$(CO)$_{12}$ | 2 hrs. | 0.10 | Toluene |
| D | {(C$_5$H$_5$)Fe(CO)$_2$}$_2$ | 12 min. | 0.10 | " |
| E | Ni(CO)$_4$ | 30 min. | 0.20 | " |
| F | {(C$_5$H$_5$)Ni(CO)}$_2$ | 16 hrs. | 0.10 | " |
| G | Mn$_2$(CO)$_{10}$ | 60 min. | 0.10 | " |
| H | (CH$_3$C$_5$H$_4$)Mn(CO)$_3$ | 5 days | 0.20 | " |

[1]Diethylene glycol dimethyl ether.

EXAMPLE 2

To demonstrate the effect of catalyst concentration on the properties of the cured composition, compositions were prepared using iron pentacarbonyl, (Fe(CO)$_5$), as a catalyst, a surface-treated fume silica (Aerosil® R972, commercially available from Degussa, Teterboro, N.J.) and a pendant-functional mercaptopolydiorganosiloxane consisting of a trimethylsiloxy-endblocked copolymer of dimethylsiloxane and 3-mercaptopropylmethylsiloxane units (hereinafter referred to as Polymer B) which had a viscosity of 17.00 Pa·s at 25° C., contained 0.41 weight percent mercapto groups and had a number average molecular weight of 13,500 as determined by fast gel permeation chromatographic analysis using polydimethylsiloxane reference standards.

Polymer B was prepared according to the following procedure. The following ingredients were added to a 3 liter, 3-necked flask equipped with a stirrer, thermometer, reflux condenser and nitrogen sparge tube. 4.1 grams of hexamethyldisiloxane and 20.2 grams of the 3-mercaptopropylmethyl hydrolyzate of 3-mercaptopropylmethyldimethoxysilane. The contents were stirred and purged with dry nitrogen gas while being heated to 70° C. At 70° C., 0.30 milliliters (ml) of trifluoromethanesulfonic acid was added to the contents and the temperature was raised to 85° C. At 85° C., approximately 500 ml (~476 grams) of a cyclic polydimethylsiloxane mixture having an average formula (Me$_2$SiO)$_{~4}$, where Me is —CH$_3$, was added to the contents over a period of 20 minutes. At the end of the addition, 0.59 ml of trifluoromethanesulfonic acid was added to the contents. Then 1050 ml (~1000 grams) of the cyclic polydimethylsiloxane mixture was added over a short period of time, the temperature being maintained at 85° C. At the end of this addition, 3 microdrops (~0.03 grams) of distilled water was added to accelerate the rate of polymerization. After 5 hours at 85° C., the contents were neutralized with 8.9 grams of sodium bicarbonate and allowed to stir overnight at room temperature. The contents of the flask were diluted with toluene to aid filtration and pressure-filtered. The filtrate was then vacuum distilled to remove volatile matter at a pressure of less than 2 millimeters of mercury until the distillation pot temperature reached 160° C. The product contained 0.446 weight percent mercapto groups and had a viscosity of 67.670 Pa·s at 25° C.

To lower the viscosity, the above product was placed in a 12 liter flask and heated to about 70° C. At 70° C., about 5.3 ml of trifluoromethanesulfonic acid and about 0.5 grams of water was added and the product was allowed to re-equilibrate by stirring the contents at about 70° C. for 5 hours. The product was then neutralized, pressure-filtered and distilled as above to recover Polymer B.

A base was prepared by milling 100 parts by weight of Polymer B with 20 parts by weight of Aerosil® R972 on a three-roll mill. This base was then placed in a SemKit® tube (commercially available from Semco, Inc., division of Products Research and Chemical Corp., Glendale, CA) which is a cylinder having the appearance of a tube used for caulking compounds which contains a means for stirring the contents and is designed to be placed in a vacuum to remove volatile materials from compositions placed inside the tube. Since the base was milled in the presence of air, the base was de-aired by subjecting it to a vacuum of 30 millimeters of mercury for 30 minutes. A seal was then placed on the back of the tube. Various levels of iron pentacarbonyl catalysts (neat) were then injected into the sealed SemKit® tube and the stirrer was used to evenly incorporate the catalyst solution into the base.

The compositions were extruded at room temperature in the presence of air into a mold and spread to a 1.6 millimeter (mm) thickness and the amount of time the extruded sample required to become tack-free when touched by a sheet of polyethylene was recorded. The physical properties of the compositions after a seven day cure in air at room temperature are recorded in Table II. The durometer value was determined by ASTM-D-2240 while the tensile strength and percent elongation were determined by ASTM-D-412.

TABLE II

| | Effect of Catalyst Concentration | | | | | |
|---|---|---|---|---|---|---|
| Ex. | Fe(CO)₅1 Parts | Tack-free Time (minutes) | Elongation (%) | Durometer (Shore A) | Tensile (kPa) | SH/Fe Molar Ratio |
| A | 1.38 | 6 | 275 | 24 | 2206 | 1.8 |
| B | 0.92 | 6 | 280 | 24 | 2310 | 2.6 |
| C | 0.46 | 5 | 320 | 18 | 2482 | 5.3 |
| D | 0.23 | 14 | 405 | 18 | 2620 | 10.6 |

1.Parts by weight per 120 parts by weight of total mercaptopolydiorganosiloxane and filler, added as a 20 percent by weight solution in a trimethylsiloxy-endblocked polydimethylsiloxane fluid (0.05 Pa.s viscosity).
2.kPa is kilopascals

EXAMPLE 3

The effect of the amount of mercapto groups present in the mercaptopolydiorganosiloxane was evaluated. A mixture of 100 parts by weight of a pendant-functional mercaptopolydiorganosiloxane, 125 parts by weight of a calcium carbonate filler and 4.33 parts by weight of a 20 weight percent solution of Fe(CO)₅ in a trimethylsiloxy endblocked polydimethylsiloxane fluid which had a viscosity of 0.05 Pa·s at 25° C. was prepared as in Example 2. The mercaptopolydiorganosiloxanes used were trimethylsiloxy-endblocked copolymers of dimethylsiloxane and 3-mercaptopropylmethylsiloxane units. The weight percent of mercapto groups was varied from 0.23 to 1.04 weight percent while keeping the total number of siloxane units present constant. The samples were extruded into molds and smoothed to a 1.6 mm thickness. The physical properties were measured after 7 days exposure to air at room temperature and are recorded in Table III below. The modulus at 100 percent elongation was determined by ASTM-D-412.

TABLE III

| | Effect of Mercapto Functionality | | | | | |
|---|---|---|---|---|---|---|
| Ex. | Weight % SH | Skin over Time (minutes) | Tack free Time (minutes) | Durometer (Shore A) | Tensile (kPa) | Elongation (%) | Modulus Elongation (kPa) |
| A | 0.23 | 5 | 20 | 22 | 896 | 500 | 483 |
| B | 0.40 | 8 | 30 | 26 | 965 | 330 | 655 |
| C | 0.55 | 6 | 30 | 31 | 1172 | 140 | 827 |
| D | 1.04 | 4 | 9 | 53 | 1793 | 80 | — |

By altering the weight percent of mercapto groups, it is thus possible to obtain cured products which range from soft, easily stretched elastomers to harder, more durable products.

EXAMPLE 4

To demonstrate the formation of a resin by curing compositions of the present invention, the 3-mercaptopropylmethyl hydrolyzate of 3-mercaptopropylmethyldimethoxysilane was prepared wherein the weight percent of mercapto groups was 24.6 and the viscosity at 25° C. was 0.08 Pa·s. Twenty grams of this hydrolyzate was mixed with 5 grams of a 10 percent by weight solution of iron pentacarbonyl (Fe(CO)₅) in mineral oil and exposed to air at room temperature. After 15 minutes, a surface skin had formed. After 12 hours, a surface skin approximately 0.38 mm thick had formed. The skin appeared to be highly cross-linked. After 3 days exposure to air at room temperature, a brittle layer approximately 1.7 mm thick had formed. After 6 days, the layer was approximately 2.0 mm thick. Generally, protective coating films range in thickness from 0.01 to 0.50 mm depending upon the application. Thus, thin layers of compositions of this type could be used to form a resinous protective coating on a substrate.

EXAMPLE 5

The effect of several variables on the cure rate was explored in the following experiment. A composition was prepared in the same manner as detailed in Example 3. The mercaptopolydiorganosiloxanes used were of the same type as Polymer B. Samples were then extruded under various conditions and the skin-over time was used as a measure of the effect of the variable on the cure rate as indicated by skin-over time. The greatest effects on cure rate were observed where the sample was heated (cure rate accelerated) and where the sample was extruded into a vacuum chamber (essentially no cure took place). This also demonstrates that air plays an important part in the cure mechanism. Fluorescent lighting was selected as a "normal" lighting source. The data indicates that light may have a slight effect on the cure rate. Ambient humidity does not appear to have much effect on the cure rate while the cure rate in water is reduced to one-half the rate in air. This may be due to the lower concentration of oxygen in the water. The results are summarized in Table IV.

TABLE IV

| | | Variables Affecting Rate of Cure | | | | | | | |
|---|---|---|---|---|---|---|---|---|---|
| | | Atmosphere | | | | Light | | Temperature | |
| Test No. | Skin-over Time | Ambient Pressure And Humidity | Ambient Pressure, 0% R. Humidity | 30 mm Hg Pressure | Under Water | Normal | Total Darkness | 22° C. | 150° C. |
| A | 8 min. | X | | | | X | | X | |
| B | 45 sec. | X | | | | | X | | X |
| C | 11 min. | | X | | | X | | X | |
| D | 16 min. | | | | X | X | | X | |
| E | 19 min. | X | | | | | X | X | |
| F | 24 hr. | | | X | | X | | X | |

EXAMPLE 6

A study of the physical properties of a cured composition as a function of time was undertaken. Two mercaptopolydiorganosiloxanes were prepared for use in this example: Polymer C which was a pendant-functional mercaptopolydiorganosiloxane consisting of a trimethylsiloxy-endblocked copolymer of dimethylsiloxane and 3-mercaptopropylmethylsiloxane units and Polymer D which was a terminal-functional mercaptopolydimethylsiloxane consisting of a 3-mercaptopropyldimethylsiloxy-endblocked polydimethylsiloxane.

Polymer C was prepared by adding 106.6 grams of the 3-mercaptopropylmethyl hydrolyzate of 3-mercaptopropylmethyldimethoxysiloxane and 8.1 grams of hexamethyldisiloxane to a 5 liter, 3-necked flask equipped with a stirrer, thermometer, reflux condenser and nitrogen sparge tube. The contents were heated to 60° C. while stirring and purging with dry nitrogen gas. At 60° C., 0.5 ml of trifluoromethanesulfonic acid was added. The contents were stirred for 30 minutes and then approximately 961 grams of a dry cyclic polydimethylsiloxane mixture having an average formula $(Me_2SiO)~_4$ was slowly added through an addition funnel. When this addition was complete, 1.27 ml of trifluoromethanesulfonic acid was added. Then 1924 grams of the dry cyclic polydimethylsiloxane mixture was added and the contents were stirred at 65° C. for 19 hours. Then 17.7 grams of sodium bicarbonate was added and the contents were allowed to stir at room temperature for 24 hours. The contents were diluted with 2 liters of dry toluene, pressure filtered through activated charcoal and diatomaceous earth, and vacuum distilled to remove volatile materials at less than 1 millimeter of mercury pressure to a distillation pot temperature of 150° C. The product in the distillation pot was Polymer C which had a viscosity of 17.00 Pa·s at 25° C., contained 1.04 weight percent mercapto groups (determined by titration with iodine) and had a number average molecular weight of 38,100.

Polymer D was prepared by adding 3366.6 grams of cyclic polydimethylsiloxane mixture and 20.6 grams of sym-tetramethyl bis(3-mercaptopropyl)disiloxane to the same type of flask used in Polymer C. The contents were heated to 60° C. while stirring and purging with dry nitrogen gas. At 60° C., 1.77 ml of trifluoromethanesulfonic acid was added and the nitrogen purge was stopped. The contents were kept at 60°–65° C. for four hours. Then the contents were cooled and 30 grams of sodium bicarbonate and the contents were stirred for 3 hours. Then 1.5 liters of toluene was added, the contents were pressure filtered through diatomaceous earth and the filtrate was vacuum distilled to 150° C. at 5–10 millimeters of mercury pressure to recover Polymer D. Polymer D had a viscosity of 14.08 Pa·s at 25° C., contained 0.16 weight percent mercapto groups and had a number average molecular weight of 35,880.

The formulation used as: (a) 20 parts by weight of Polymer C; b. 80 parts by weight of Polymer D; (c) 150 parts by weight of a calcium carbonate filler; and (d) 4.8 parts by weight of a 20 percent by weight solution of iron pentacarbonyl $(Fe(CO)_5)$ in a trimethylsiloxy endblocked polydimethylsiloxane fluid with a viscosity of 0.05 Pa·s at 25° C. The above composition was mixed as outlined in Example 2 and extruded in the presence of air at room temperature (22° C.). The physical properties were tested at various intervals and the results are tabulated in Table V. The data obtained indicates that the polymerization or cure process is approximately 85 percent complete in 18 hours for a sample 1.6 mm thick.

TABLE V

| | Physical Properties as a Function of Time | | | |
|---|---|---|---|---|
| Time (22° C.) (days) | Durometer (Shore A) | Tensile Strength (kPa) | Elongation (%) | Modulus @ 100% Elongation (kPa) |
| 0.75 | 29 | 896 | 190 | 565 |
| 1.0 | 29 | 965 | 200 | 621 |
| 2.0 | 30 | 1034 | 220 | 655 |
| 3.2 | 31 | 965 | 250 | 621 |
| 6.0 | 34 | 1172 | 270 | 758 |
| 7.0 | 34 | 1138 | 270 | 758 |

EXAMPLE 7

A study of the change in properties of the cured compositions resulting from varying the ratio of pendant- to terminal-functional mercaptopolydiorganosiloxane was made. One hundred parts by weight of total mercaptoorganosiloxanes with the same type and amount of filler and catalyst found in Example 6 were used in this study. The weight ratio of pendant-functional to terminal-functional mercaptopolydiorganosiloxane was varied as shown in Table VI and the properties of the cured compositions were determined after 6 days exposure to air at room temperature (22° C.). Generally, the greater the amount of terminal-functional mercaptopolydimethylsiloxane present, the greater the elongation value and the softer the cured composition became.

TABLE VI

Effect of Varying the Pendant/Terminal Ratio

| Pendant/Terminal-Functional Mercapto polydiorganosiloxane Ratio | Skin-over Time (minutes) | Tack-free Time (minutes) | Durometer (Shore A) | Tensile Strength (kPa) | Elongation (%) | Modulus @ 100 Elongation (kPa)% |
|---|---|---|---|---|---|---|
| 50/50 | 5 | 9 | 49 | 1586 | 130 | 1517 |
| 33/67 | 7 | 10 | 44 | 1413 | 160 | 1207 |
| 20/80 | 8 | 17 | 34 | 1172 | 270 | 758 |

EXAMPLE 8

Iron carbonyl complexes containing conjugated olefins other than cyclopentadiene were tested for catalytic activity. Butadieneiron tricarbonyl {$(C_4H_6)Fe(CO)_3$} and cyclohexadieneiron tricarbonyl {$(C_6H_8)Fe(CO)_3$} were selected and were compared with iron pentacarbonyl ($Fe(CO)_5$) in the following formulation. The following compositions were prepared in the absence of air by the method outlined in Example 2: 100 parts by weight of Polymer B; 125 parts by weight of a calcium carbonate filler and 0.5 percent by weight of each catalyst, based on the total weight of the composition, which was added as a 20 percent by weight solution in mineral oil. Samples were extruded in the presence of air at room temperature and the properties of each sample were determined after 7 days exposure to air at room temperature. The data in Table VII indicate that such catalysts are also useful in formulating compositions of the present invention.

TABLE VII

Olefinic Iron Carbonyl Catalysts

| Catalyst | Skin-over Time (minutes) | Tack-free Time (minutes) | Durometer (Shore A) | Tensile Strength (kPa) | Elongation (%) | Modulus @ 100% Elongation (kPa) |
|---|---|---|---|---|---|---|
| $Fe(CO)_5$ | 18 | 30 | 25 | 1034 | 455 | 710 |
| $C_4H_6Fe(CO)_3$ | 25 | 45 | 18 | 998 | 625 | 448 |
| $C_6H_8Fe(CO)_3$ | 50 | 105 | 9 | 724 | 595 | 276 |

EXAMPLE 9

The utility of cyclopentadienylcobalt dicarbonyl $(C_5H_5)Co(CO)_2$ was demonstrated by the following experiment. Ten grams of a pendant-functional mercaptopolydiorganosiloxane was mixed with 0.1 gram of $(C_5H_5)Co(CO)_2$ (neat) and exposed to air at room temperature (22° C.). The pendant-functional mercaptopolydiorganosiloxane had the same general formula as polymer B, but was from a different batch which had a viscosity of 38.93 Pa·s at 25° C., contained 0.41 weight percent of mercapto groups, and had a number average molecular weight of 80,500. After 40 minutes, a surface skin had formed. After 60 minutes, the surface skin was well-defined and tack-free while the material underneath remained fluid. After 90 minutes, the surface layer of cured composition was approximately 0.38 mm thick.

EXAMPLE 10

To optimize the properties and cost, two formulations were prepared using both a surface-treated silica filler and a calcium carbonate filler. Polymer E, as used in this Example, was a pendant-functional mercaptopolydiorganosiloxane of the same type as polymer B and consisted of a trimethylsiloxy-endblocked copolymer of dimethylsiloxane and 3-mercaptopropylmethylsiloxane units which had a viscosity of 48.96 Pa·s at 25° C. and contained 0.43 weight percent mercapto groups.

The first formulation is suggested for use as a general sealant and was produced by weight 100 parts of Polymer E and 20 parts of a surface-treated silica filler (Aerosil ® R972, see Example 2) together and then mixing those ingredients together with 75 parts of a calcium carbonate filler. Then, 20.6 parts of a trimethylsiloxy-endblocked polydimethylsiloxane fluid was added. This base was then thoroughly mixed using a three-roll mill. The base was then placed in a SemKit ® tube and the procedure for preparing the catalyzed compositions outlined in Example 2 was followed. The catalyst solution injected was 5.5 parts of the same type of 20% $Fe(CO)_5$ solution used in Example 3. The physical properties of samples extruded into a mold in the presence of air at room temperature are as follows: Skin-over time—6 minutes; Tack-free Time—10-14 minutes and after 7 days at room temperature in the presence of air: Durometer-28 (Shore A); Tensile Strength—1999 kPa; Elongation at Break—400% and the Modulus at 100% elongation—827 kPa.

A second formulation is suggested for use as a construction sealant and was prepared in the same manner as shown above: 100 parts of Polymer E, 12 parts of the above surface-treated fume silica; 160 parts of a calcium carbonate filler; 24 parts of the above 0.5 Pa·s polydimethylsiloxane fluid and 7.55 parts of the 20% $Fe(CO)_5$ solution used above. The physical properties of samples extruded into a mold in the presence of air at room temperature were: Skin-over Time—6-10 minutes; Tack-Free Time—15-19 minutes and after about 7 days exposure to air at room temperature Durometer-29 (Shore A); Tensile Strength—1517 kPa; Elongation at Break—405% and Modulus at 100% Elongation—841 kPa. The above samples showed excellent cured surfaces, but did not show good adhesion to most substrates. The adhesion could be improved by using a surface primer. The calculated molar ratio of SH/Fe in the first formulation is 2.3 and that of the second is 1.7.

That which is claimed is:

1. A composition of matter, stable in the absence of oxygen, consisting essentially of a product obtained by mixing the following substantially in the absence of oxygen (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

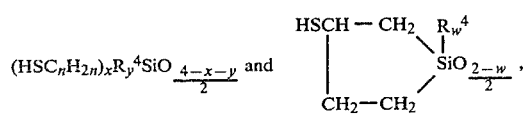

any other siloxane units present having the average unit formula

wherein
each $R^2$ is a hydroxyl radical or an organic radical selected from the group consisting of $R^4$ and 3,3,3-trifluoropropyl radicals,
each $R^4$ is $R^3$ or $OR^1$,
each $R^3$ is an alkyl radical of 1 to 4 inclusive carbon atoms or phenyl radical,
each $R^1$ is an alkyl radical of 1 to 4 inclusive carbon atoms,
  n has a value of from 2 to 4 inclusive,
  w has a value of from 0 to 1 inclusive,
  x has a value of from 1 to 2 inclusive,
  y has a value of from 0 to 2 inclusive,
  z has a value of from 0 to 3 inclusive and the sum of x+y has a value of from 1 to 3 inclusive,
and the ratio of the total $R^3$, $HSC_nH_{2n}$—,

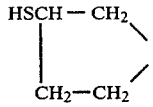

and 3,3,3-trifluoropropyl radicals to silicon atoms in the mercapto-functional organosiloxane is in the range of 0.98/1 to 3.00/1;
(B) 0 to 200 parts by weight of at least one filler; and
(C) a catalytic amount of a metal carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$, dicyclopentadienyldinickel dicarbonyl, $Mn_2(CO)_{10}$, methylcyclopentadienylmanganese tricarbonyl, and cyclopentadienylcobalt dicarbonyl.

2. The composition as claimed in claim 1 wherein the catalytic amount of (C) is in a range of 0.1 to 6 parts by weight of metal carbonyl catalyst per 100 parts by weight of the mercapto-functional organosiloxane and the metal carbonyl catalyst is $Fe(CO)_5$.

3. The composition as claimed in claim 2 wherein the mercapto-functional organosiloxane is at least one pendant-functional mercaptopolydiorganosiloxane containing $R_3^3SiO_{0.5}$ endblocking siloxane units and mercapto-functional siloxane units selected from the group consisting of

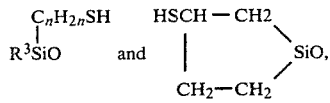

any remaining siloxane units being $R_2^3SiO$, wherein the average number of mercapto-functional siloxane units per molecule is greater than 2 and the number average molecular weight of the pendant-functional mercaptopolydiorganosiloxane is less than 400,000.

4. The composition as claimed in claim 3 wherein $R^3$ is methyl, n is 3, and the pendant-functional mercaptopolydiorganosiloxane has a number average molecular weight of less than 100,000 and contains a sufficient number of mercapto-functional siloxane units to a result in a weight percentage of mercapto groups in the range of 0.14 to 2.5 percent based on the total weight of pendant-functional mercaptopolydiorganosiloxane.

5. The composition as claimed in claim 2 wherein the mercapto-functional organosiloxane is at least one hybrid-functional mercaptopolydiorganosiloxane containing two mercapto-functional siloxane units selected from the group consisting of $(HSC_nH_{2n})R_2^3SiO_{0.5}^*$, $(HSC_nH_{2n})(R^1O)_2SiO_{0.5}$,

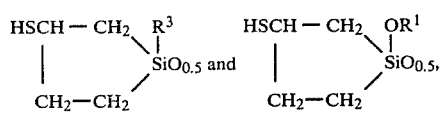

and at least one mercapto-functional siloxane unit selected from the group consisting of $(HSC_nH_{2n})R^3SiO$ and

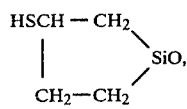

any remaining units being $R_2^3SiO$, wherein the number average molecular weight of the hybrid-functional mercaptopolydiorganosiloxane is less than 400,000.

6. The composition as claimed in claim 2 wherein the mercapto-functional organosiloxane is at least one hybrid-functional mercaptopolydiorganosiloxane containing two mercapto-functional siloxane units selected from the group consisting of $(HSCH_2CH_2CH_2)(CH_3)_2SiO_{0.5}$ and

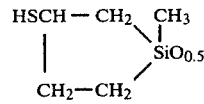

and at least one mercapto-functional siloxane unit selected from the group consisting of $(HSCH_2CH_2CH_2)(CH_3)SiO$ and

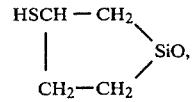

any remaining units being $(CH_3)_2SiO$, wherein the hybrid-functional mercaptopolydiorganosiloxane has a number average molecular weight of less than 100,000 and contains a sufficient number of mercapto-functional siloxane units to result in a weight percentage of merapto groups in the range of 0.14 to 3 percent based on the total weight of hybrid functional mercaptopolydiorganosiloxane.

7. The composition as claimed in claim 3 having admixed therewith at least one terminal-functional mercaptopolydiorganosiloxane containing mercapto-functional siloxane units selected from the group consisting of $HSC_nH_{2n}(R^3)_2SiO_{0.5}$, $HSC_nH_{2n}(R^1O)_2SiO_{0.5}$,

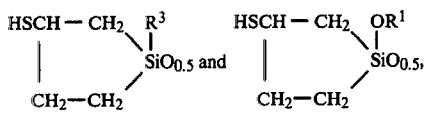

any remaining siloxane units being $R_2{}^3SiO$, wherein the number average molecular weight of the terminal-functional mercaptopolydiorganosiloxane is less than 400,000.

8. The composition as claimed in claim 4 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

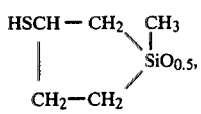

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.45 percent based on the total weight of terminal-functional mercaptopolydiorganosiloxane and the total weight percent of mercapto groups in the admixed mercaptopolydiorganosiloxanes is in the range of 0.14 to less than 2.5 percent of the total weight of the admixed mercaptopolydiorganosiloxanes.

9. The composition as claimed in claim 5 having admixed therewith at least one terminal-functional mercaptopolydiorganosiloxane containing mercapto-functional siloxane units selected from the group consisting of $HSC_nH_{2n}(R^3)_2SiO_{0.5}$, $HSC_nH_{2n}(R^1O)_2SIO_{0.5}$,

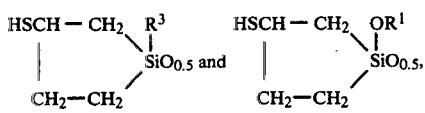

any remaining siloxane units being $R_2{}^3SiO$, wherein the number average molecular weight of the terminal-functional mercaptopolydiorganosiloxane is less than 400,000.

10. The composition as claimed in claim 6 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

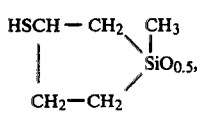

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.45 percent based on the total weight of terminal-functional mercaptopolydiorganosiloxane and the total weight percent of mercapto groups in the admixed mercaptopolydiorganosiloxanes is in the range of 0.14 to less than 3.0 percent of the total weight of the admixed mercaptopolydiorganosiloxanes.

11. A composition which consists essentially of a product formed upon exposure of the composition of claim 2 to oxygen.

12. A cured composition which consists essentially of an elastomer formed upon exposure of the composition of claim 4 to oxygen.

13. A cured composition which consists essentially of an elastomer formed upon exposure of the composition of claim 6 to oxygen.

14. A cured composition which consists essentially of an elastomer formed upon exposure of the composition of claim 8 to oxygen.

15. A cured composition which consists essentially of an elastomer formed upon exposure of the composition of claim 10 to oxygen.

16. A method of forming a higher molecular weight product which consists essentially of the steps of
(I) mixing
(a) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

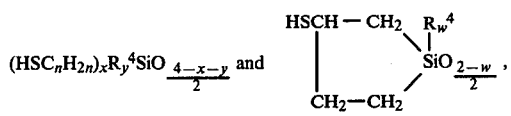

any other siloxane units present having the average unit formula

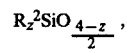

wherein
each $R^2$ is a hydroxyl radical or an organic radical selected from the group consisting of $R^4$ and 3,3,3-trifluoropropyl radicals,
each $R^4$ and $R^3$ is $OR^1$,
each $R^3$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive and the sum of x+y has a value of from 1 to 3 inclusive,
and the ratio of the total $R^3$, $HSC_nH_{2n}$—,

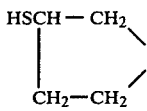

and 3,3,3-trifluoropropyl radicals to silicon atoms in the mercapto-functional organosiloxane is in the range of 0.98/1 to 3.00/1; and (b) a catalytic amount of a metal carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$, dicyclopentadienyldinickel dicarbonyl, $Mn_2(CO)_{10}$, methylcyclopentadienylmanganese tricarbonyl and cyclopentadienylcobalt dicarbonyl, to form a mixture, and (II) exposing said mixture to oxygen.

17. The method as claimed in claim 16 wherein the amount of metal carbonyl catalyst is in a range of 0.1 to 6 parts by weight per 100 parts by weight of (I)(a) and the metal carbonyl catalyst is $Fe(CO)_5$.

18. The method as claimed in claim 16 wherein the mixture of (I) additionally contains up to 200 parts by weight of at least one filler per 100 parts by weight of (I)(a).

19. A composition which consists essentially of the higher molecular weight product obtained in accordance with the method of claim 16.

20. A composition which consists essentially of the higher molecular weight product obtained in accordance with the method of claim 17.

21. A composition which consists essentially of the higher molecular weight product obtained in accordance with the method of claim 18.

22. The composition as claimed in claim 1 wherein the catalytic amount of (C) is in a range of 0.1 to 6 parts by weight of metal carbonyl catalyst per 100 parts by weight of the mercapto-functional organosiloxane.

23. The composition as claimed in claim 1 wherein the metal carbonyl catalyst is selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl, the amount of said catalyst present being such that the ratio of total moles of —SH present in (A) to total moles of iron atoms present in said catalyst is greater than one.

24. The composition as claimed in claim 1 wherein the metal carbonyl catalyst is $Fe(CO)_5$, the catalytic amount of $Fe(CO)_5$ is in a range of 0.1 to 6 parts by weight per 100 parts by weight of (A) and the amount of $Fe(CO)_5$ present is such that the ratio of total moles of —SH present in (A) to total moles of iron atoms present in the $Fe(CO)_5$ is greater than one.

25. The composition as claimed in claim 1 which contains at least one filler.

26. The composition as claimed in claim 2 which contains at least one filler.

27. The composition as claimed in claim 11 which contains at least one filler.

28. The composition as claimed in claim 22 which contains at least one filler.

29. The composition as claimed in claim 23 which contains at least one filler.

30. The composition as claimed in claim 24 which contains at least one filler.

* * * * *

UNITED STATES PATENT AND TRADEMARK OFFICE
CERTIFICATE OF CORRECTION

PATENT NO. : 4,252,932
DATED : February 24, 1981
INVENTOR(S) : GARY R. HOMAN et al.

It is certified that error appears in the above-identified patent and that said Letters Patent are hereby corrected as shown below:

Column 10, line 52, "CO)$\{_2,$" should read --CO$\}_2,$--.

Column 14, line 23, in the last column of Table III, the heading "Modulus Elongation (kPa)" should read --Modulus 100% Elongation (kPa)--.

Column 20, line 18, the formula "$(HSC_nH_{2n})R_2^3SiO_{0.5}$*," should read --$(HSC_nH_{2n})R_2^3SiO_{0.5},$--.

Column 21, line 43, the formula "$HSC_nH_{2n}(R'O)_2SIO_{0.5}$" should read --$HSC_nH_{2n}(R'O)_2SiO_{0.5}$--.

Column 22, line 56, the line "each $R^4$ and $R^3$ is $OR^1$" should read --each $R^4$ is $R^3$ or $OR^1$--.

Signed and Sealed this

Twenty-sixth Day of January 1982

[SEAL]

Attest:

GERALD J. MOSSINGHOFF

Attesting Officer   Commissioner of Patents and Trademarks